July 11, 1967
M. M. MILLS
3,330,577
FOLDABLE AND DEMOUNTABLE REAR STEP ASSEMBLY FOR VEHICLES
Filed Feb. 21, 1966
2 Sheets-Sheet 1
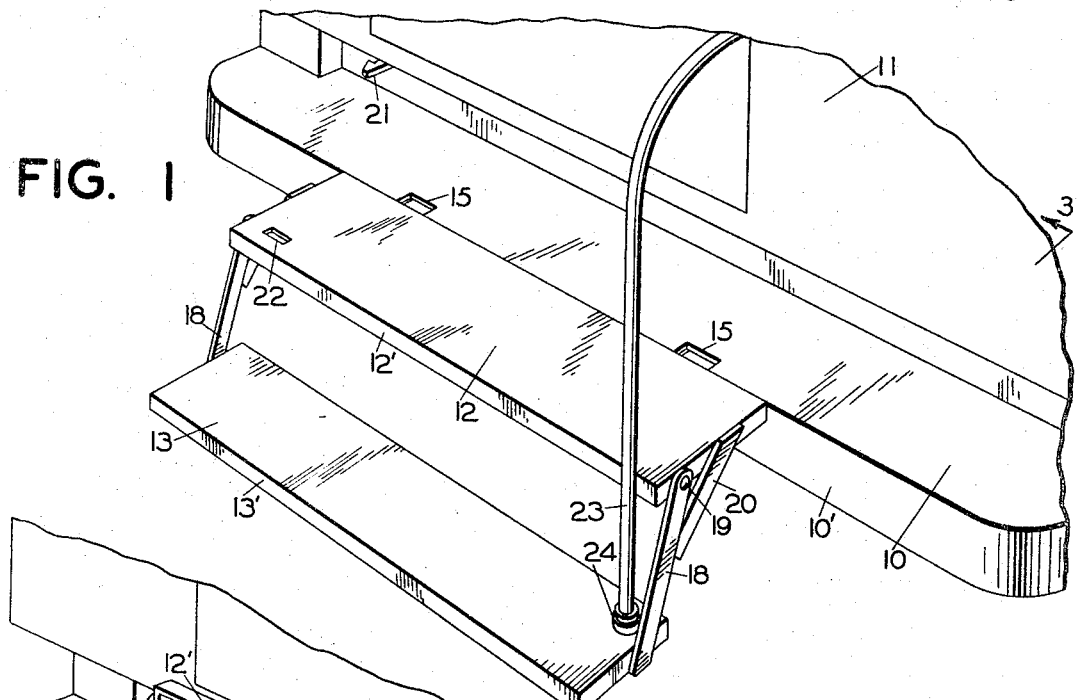
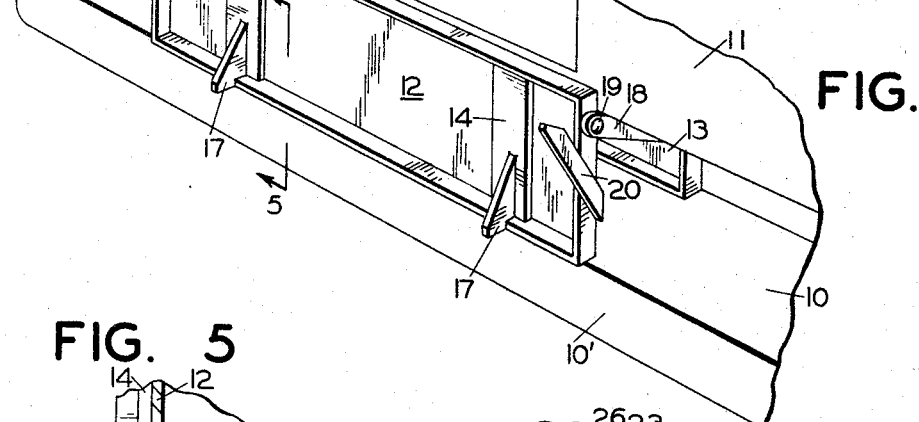
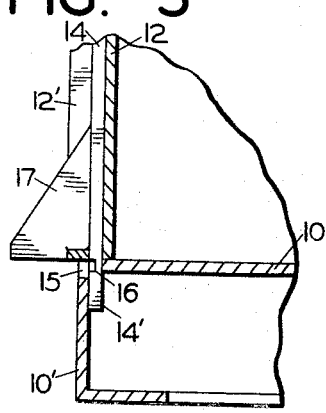
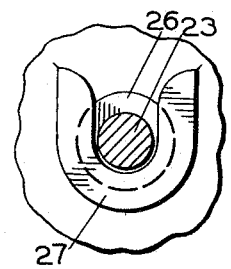
INVENTOR.
MARVIN M. MILLS
BY *T. L. Geisler*
ATTORNEY July 11, 1967 M. M. MILLS 3,330,577
FOLDABLE AND DEMOUNTABLE REAR STEP ASSEMBLY FOR VEHICLES
Filed Feb. 21, 1966 2 Sheets-Sheet 2
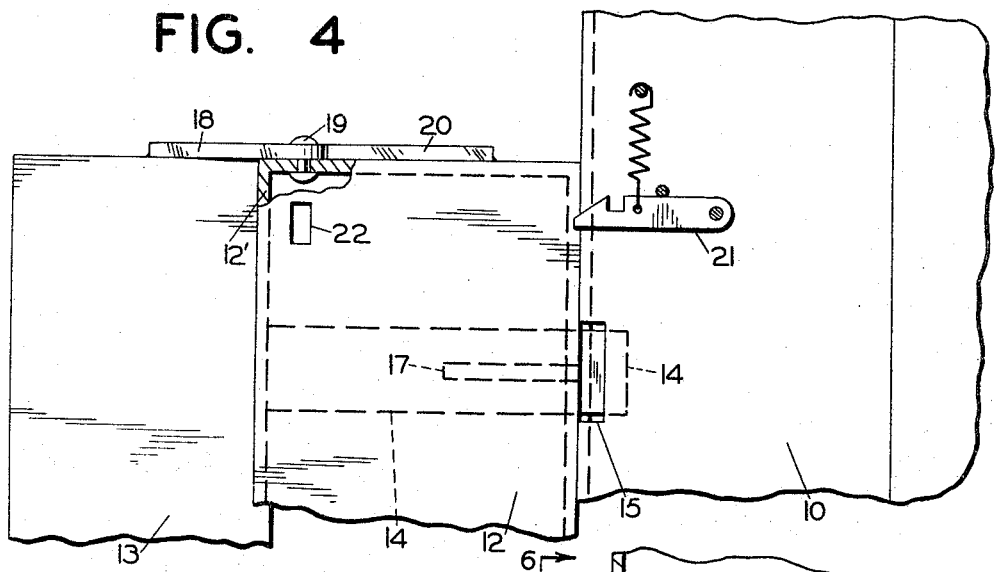
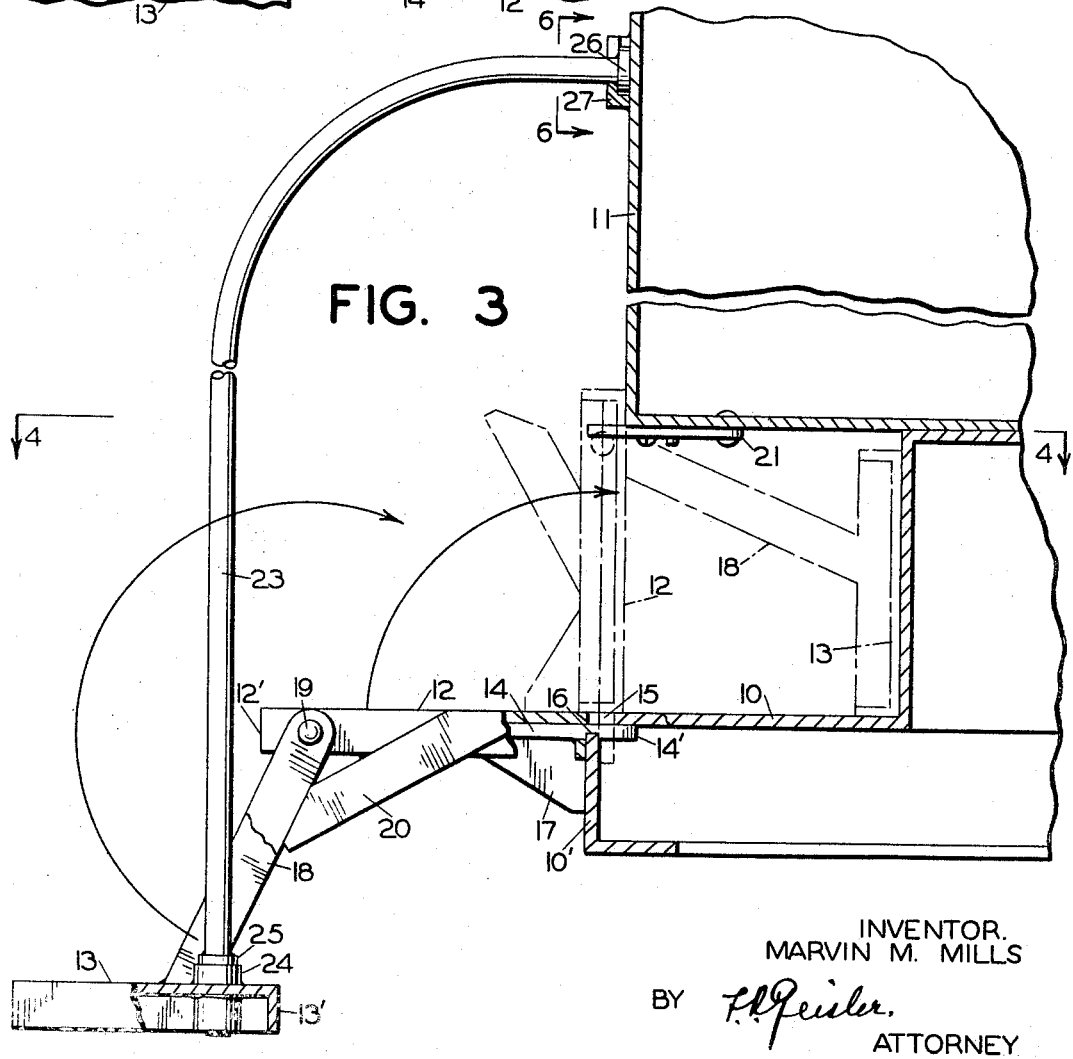
INVENTOR.
MARVIN M. MILLS
BY *F. L. Geisler*
ATTORNEY

United States Patent Office 3,330,577
Patented July 11, 1967

3,330,577
FOLDABLE AND DEMOUNTABLE REAR STEP
ASSEMBLY FOR VEHICLES
Marvin M. Mills, 3321 SE. 3rd Ave.,
Camas, Wash. 98607
Filed Feb. 21, 1966, Ser. No. 529,105
3 Claims. (Cl. 280—166)

This invention relates in general to detachable steps for vehicles, and, more particularly to auxiliary steps required for use on the rear of such vehicles as "campers" and pick-up trucks having house compartments mounted thereon.

An object of the invention is to provide a practical step assembly which may be quickly and easily mounted in place on the rear bumper or rear chassis member of a "camper" vehicle, or pick-up truck, and quickly and easily demounted from the same.

Another object of the invention is to provide a step assembly which, when mounted in place on such vehicle, may readily be folded up into out-of-the-way position while remaining mounted on the vehicle and carried in such position, thus being available for immediate use upon being unfolded.

A still further object of the invention is to provide a foldable step assembly which may be quickly removed entirely from its mounting for storage elsewhere in the vehicle, and subsequently mounted back in place either unfolded for immediate use or for being carried in mounted but folded-up position.

An additional object is to provide an improved foldable and demountable step assembly adapted for the uses indicated which will be very simple and practical in construction and capable of being manufactured and sold at very moderate cost.

The manner in which the assembly of the present invention is constructed and its manner of use will be readily understood from the following brief description in which reference is made to the accompanying drawings:

In the drawings:

FIGURE 1 is a perspective view showing the entire step assembly in mounted and unfolded position in place on the rear bumper of a conventional pick-up truck having a house compartment thereon, this view showing an optional and removable hand rail at one side of the assembly;

FIGURE 2 is a corresponding perspective view showing the step assembly in folded-up position while still mounted on the vehicle and secured in this folded-up position available for immediate use when desired, the step assembly in this case being without the optional hand rail;

FIGURE 3 is a side elevation of the step assembly taken on the line indicated at 3—3 in FIGURE 1, drawn to a larger scale, showing the step assembly and adjacent portion of the vehicle, the step assembly being shown in full line in the unfolded usable position of FIGURE 1 and in broken line in the folded-up position of FIGURE 2;

FIGURE 4 is a fragmentary plan view on the line 4—4 of FIGURE 3;

FIGURE 5 is a fragmentary sectional elevation taken on the line indicated at 5—5 in FIGURE 2 drawn to the same scale as FIGURE 2, showing certain details of construction in the step assembly; and FIGURE 6 is a fragmentary sectional elevation on line 6—6 of FIGURE 3, drawn to a larger scale, showing the manner in which the top end of an optional side railing for the assembly is removably held in place.

Referring first to FIGURES 1 and 3, the rear bumper, either of the chassis of a conventional "camper" vehicle or pick-up truck on which housing units are commonly mounted, is indicated at 10 a portion of the housing unit in either case being indicated at 11. The rear bumper 10 has a horizontal top surface plate and the customary integral rear flange 10' extending downwardly therefrom. It is assumed that the house unit has the usual rear door for which a step assembly is desired.

The step assembly of the present invention includes a top step 12 comprising a top plate and integral downwardly extending border flange 12', and a bottom step 13 similarly comprising a top plate and border flange 13', such step construction being preferred since it provides rigidity for each step without excessive weight or use of metal.

A pair of transversely extending rigid support bars 14 (FIGURES 2, 3, and 5) are secured on the underside of the top step 12. As shown in FIGURES 3 and 5, these bars 14 have ends 14' which extend beyond the inner edge of the top step 14, and these extending ends of the bars extend under the top plate of the bumper 10 when the assembly is in the mounted unfolded position of FIGURE 3.

A pair of notches 15 are cut out of the rear edge of the top plate of the bumper and out of the adjacent top of the rear flange 10' of the bumper to accommodate the ends 14' of the support bars 14. The length of each of these notches is only slightly greater than the width of a support bar 14. Assuming that the top plate of the bumper 10, and the top plate of the step 12, as well as the support bars 14, all have the same thickness, as indicated in the drawings, the depth of each of these notches 15 in the top plate of the bumper is approximately twice the thickness of the support bars 14, while the depth of each notch in the flange 10' below the top plate of the bumper is slightly less than the thickness of the support bars 14. The reason for this will presently be apparent.

Each of the support bars 14 has a notch 16 on its bottom face (FIGURES 3 and 5) having a width equal to the thickness of the flange 10' of the bumper, and the location of this notch 16 in each support bar 14 is such that when the top step 12 is set in place against the edge of the bumper 10 the notch 16 will engage the top of the notched portion of the flange 10' of the bumper, as shown in FIGURE 3.

As will now be evident from FIGURE 3, the top step 12 is set in place on the bumper 10 by inserting the ends 14' of the support bars 14 in the corresponding notches 15 with the step 12 first in substantially vertical position. Then, when the step is brought down to horizontal position, the notch 16 of each bar 14 engages the flange 10' of the bumper and the end 14' of each bar engages the underside of the top plate of the bumper, thus holding the top step 12 flush with the bumper. In this way the top step 12 is not only held in horizontal position and in the same plane as the bumper, but also the top step cannot be pulled away from the bumper without being first swung up into substantially vertical position and then lifted up from the bumper.

In order to hold the top step 12 more firmly in horizontal and operative position, an additional support bracket 17 is welded on the bottom of each bar 14 (FIGURES 2, 3, and 5) and so arranged as to bear against the outer face of the flange 10' of the bumper when the step 12 is in the mounted operative position.

The bottom step 13 is rigidly secured on each side to the end of an arm 18. The opposite ends of this pair of arms 18 are pivotally mounted on the sides of the top step 12 respectively in the location shown in the figures, this mounting being by suitable pivot bolts 19. A stop bar 20 is rigidly secured on each side of the top step and is so arranged and positioned, as shown in FIGURES 1 and 3, to limit the downward swing of the corresponding arm 18 and thus hold the lower step 13 in the desired lower position relatively with respect to the upper step 12 when the lower step is swung downwardly into operative position to the extent permitted by the stop bars 20. Such mounting of the lower step 13 with respect to the upper step 12 according enables the lower step to be swung upwardly over the upper step when the step assembly is to be placed in folded-up inoperative position.

When the lower step 13 is swung up over the upper step and the upper step is swung up into substantially vertical position the step assembly assumes the position illustrated in FIGURE 2 and also shown in broken lines in FIGURE 3. To enable the assembly to be carried on the bumper 10 in this folded-up out-of-the-way position, a spring-actuated catch 21 (shown in FIGURE 4 and also in FIGURE 2) is mounted on the underside of the rearwardly-extending portion of the house unit 11 above the bumper. The upper step 12 is provided with a slot 22 (FIGURE 1) to engage the catch 21 when the upper step is swung into such vertical position.

If it is desired to remove the step assembly entirely this is easily done by tipping the upper step and lifting it upwardly, as previously mentioned, so as to cause the ends 14' of the support bars 14 to be drawn up and out from the notches 15 of the bumper. Thereupon the lower step may be swung over the upper step to bring the step assembly into more compact arrangement suitable for storing either inside the vehicle or anywhere else desired.

The step assembly also includes a removable hand rail 30 for one side of the steps, the use of which rail is optional. Assuming that it is desired in a particular case to have the hand rail set up, as illustrated in FIGURES 1 and 3, the hand rail is put in place after the steps are mounted in operable position on the bumper, and similarly the hand rail is removed first when the steps either are to be placed in folded up position or are to be demounted entirely.

The hand rail consists of a single curved, preferably tubular, bar rail 30 as shown. The lower step 13 is provided with a boss 31 at the side having a cylindrical channel extending through the boss and through the step, which channel has an internal diameter corresponding approximately to the exterior diameter of the insertable end of the bar 30. A collar 32 is secured near the bottom end of the bar 30 to limit the extent to which it can extend down through the channel in the boss and step.

A disc 33 is secured on the top end of the bar rail 30. A U-shaped socket 34 for receiving the disc 33 and top end of the bar rail 30 is secured on the wall of the housing unit on the corresponding side of the doorway. As apparent, such bar rail 30 is quickly and easily installed when the steps are mounted in operative position by inserting the bottom end of the rail bar in place in the lower step and inserting the disc 33 at the top end of the bar in the corresponding U-shaped socket 34. Removing of the rail bar similarly is quickly and easily accomplished when the steps are to be folded-up or entirely demounted.

I claim:

1. A foldable and demountable rear step assembly for use on a vehicle equipped with a rear bumper having a flat top and downwardly extending rear edge flange, said assembly including a top step, a pair of transversely-extending support bars secured to the underside of said top step, said bars extending beyond the edge of said top step toward the vehicle bumper for engagement with said bumper, said bumper provided with a pair of slots for receiving the extending ends of said bars respectively, each of said bumper slots being cut out from the rear edge of the top of said bumper and from the top of the downwardly-extending bumper flange, said extending ends of said support bars provided with a pair of notches on their bottom faces respectively for engagement with the top edges of said bumper flange in said bumper slots, the depth of said slots in said bumper flange and the depth of said notches in said ends of said support bars being such that the ends of said support bars will rest against the underside of said top of said bumper and be held in parallelism therewith when said notches in said support bars are engaged by said bumper flange in said slots, a pair of right-angle support brackets secured on the underside of said top step so positioned as to bear against said bumper flange when said extending ends of said support bars rest against the underside of said bumper, a bottom step in said assembly, a pair of arms rigidly secured to the sides of said bottom step respectively, the upper ends of said arms pivotally mounted on the ends of said top step respectively, and a pair of stop elements rigidly mounted on the ends of said top step respectively for limiting the downward swing of said arms and therewith the downward movement of said bottom step with respect to said top step, whereby said bottom step may be swung upwardly over said top step when said assembly is not used but whereby said bottom step will be held in proper position below said top step when said assembly is in use.

2. The combination set forth in claim 1 with the addition of means for holding said step assembly in folded-up position on said bumper when said bottom step is swung up over said top step and said top step is tilted to upright position with the ends of said support bars extending downwardly in said bumper slots.

3. A foldable and demountable rear step assembly for use on a vehicle equipped with a rear bumper having a flat top and downwardly extending rear edge flange, said assembly comprising a top step and a bottom step, each of said steps having a top tread plate and downwardly extending periphereal flange, a pair of transversely extending support bars secured to the underside of the tread plate of said top step, said bars extending beyond the edge of said top step towards the vehicle bumper for engagement with said bumper, said bumper provided with a pair of slots for receiving the extending ends of said bars respectively, each of said slots being cut out from the rear edge of said top of said bumper and from the top of said bumper flange, said extending ends of said support bars provided with a pair of notches on their bottom faces respectively for engagement with the top edges of said bumper flange in said bumper slots, the depth of said slots in said bumper flange and the depth of said notches in said ends of said support bars being such that said ends of said support bars will rest against the underside of said top of said bumper and be held in parallelism therewith when said notches in said support bars are engaged by said bumper flange in said slots, a pair of right angle support brackets secured on the underside of said support bars respectively and so positioned as to bear against said bumper flange when said extending ends of said support bars rest against the underside of said top of said bumper, a pair of arms rigidly secured to the sides of said bottom step respectively, the upper ends of said arms pivotally mounted on the ends of said top step respectively, a pair of stop elements rigidly mounted on the ends of said top step respective for limiting the downward swing of said arms and therewith the downward movement of said bottom step with respect to said top step, whereby said bottom step may be swung upwardly over said top step when said assembly is not in use but said bottom step will be held in proper position below said top step when said assembly is being used, means for holding said assembly in folded-up position on said bumper when said bottom step is swung up over said top step and said top step is tilted to upright position with said ends of said support bars extending downwardly in said bumper slots, and a demountable hand rail for said assembly for use when said assembly is in operative position, a socket for said hand rail in said bottom step, the bottom end of said hand rail removably insertable in said socket, means limiting the extent to which said end of said rail may be inserted in said socket, a socket for the top end of said hand rail on the rear wall of the vehicle assembly, and means for removably holding said rail top end in said last mentioned socket.

References Cited
UNITED STATES PATENTS

| | | | |
|---|---|---|---|
| 2,324,507 | 7/1943 | Johnson | 280—166 |
| 2,484,312 | 10/1949 | Rebours | 280—166 |
| 2,747,888 | 5/1956 | Jones | 182—88 |

BENJAMIN HERSH, *Primary Examiner.*

L. D. MORRIS, *Assistant Examiner.*